(12) United States Patent
Sugai

(10) Patent No.: US 9,674,384 B2
(45) Date of Patent: Jun. 6, 2017

(54) IMAGE READING DEVICE AND IMAGE FORMING APPARATUS INCLUDING SAME

(71) Applicant: Atsushi Sugai, Kanagawa (JP)

(72) Inventor: Atsushi Sugai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/284,590

(22) Filed: Oct. 4, 2016

(65) Prior Publication Data

US 2017/0118363 A1    Apr. 27, 2017

(30) Foreign Application Priority Data

Oct. 27, 2015  (JP) .................................. 2015-210369

(51) Int. Cl.
| | | |
|---|---|---|
| *G03G 15/00* | (2006.01) | |
| *H04N 1/00* | (2006.01) | |
| *H04N 1/10* | (2006.01) | |

(52) U.S. Cl.
CPC ..... *H04N 1/00795* (2013.01); *H04N 1/00559* (2013.01); *H04N 1/1065* (2013.01); *H04N 2201/0081* (2013.01); *H04N 2201/0094* (2013.01)

(58) Field of Classification Search
USPC ........................................................ 399/107
See application file for complete search history.

(56) References Cited

U.S. PATENT DOCUMENTS

| 5,734,483 A * | 3/1998 | Itoh | H04N 1/031 358/474 |
|---|---|---|---|
| 6,424,435 B1 * | 7/2002 | Kao | H04N 1/00519 358/483 |
| 6,762,864 B2 * | 7/2004 | Kao | H04N 1/04 358/474 |
| 2008/0304114 A1* | 12/2008 | Wu | H04N 1/0313 358/497 |
| 2009/0074446 A1* | 3/2009 | Idehara | G03G 21/1666 399/107 |
| 2011/0181924 A1* | 7/2011 | Mui | H04N 1/1017 358/497 |
| 2013/0083371 A1* | 4/2013 | Osakabe | H04N 1/103 358/474 |

(Continued)

FOREIGN PATENT DOCUMENTS

| JP | 2007-043684 | 2/2007 |
|---|---|---|
| JP | 2013-120227 | 6/2013 |

*Primary Examiner* — Rodney Fuller
(74) *Attorney, Agent, or Firm* — Harness, Dickey & Pierce, P.L.C.

(57) ABSTRACT

An image reading device includes a frame, an image reading unit, a guide, a biasing member, and an adjuster. The image reading unit reads, while moving in a predetermined direction, image information of a document placed on an exposure glass. The guide extends in the predetermined direction and is supported by the frame, to engage and guide the image reading unit to move the image reading unit in the predetermined direction. The biasing member biases the guide in a direction against a direction in which the guide bends due to weight of the guide and weight of the image reading unit. The adjuster adjusts a biasing force of the biasing member against the guide.

7 Claims, 5 Drawing Sheets

(56) References Cited

U.S. PATENT DOCUMENTS

| | | | | |
|---|---|---|---|---|
| 2013/0335790 A1* | 12/2013 | Narai | ............ | H04N 1/0249 |
| | | | | 358/497 |
| 2014/0009800 A1* | 1/2014 | Yoshida | ............ | H04N 1/1039 |
| | | | | 358/497 |
| 2014/0104660 A1* | 4/2014 | Liu | ............ | H04N 1/1039 |
| | | | | 358/497 |

* cited by examiner

COMPARATIVE EXAMPLE

COMPARATIVE EXAMPLE

IMAGE READING DEVICE AND IMAGE FORMING APPARATUS INCLUDING SAME

CROSS-REFERENCE TO RELATED APPLICATION

The present application claims priority pursuant to 35 U.S.C. §119(a) from Japanese patent application number 2015-210369, filed on Oct. 27, 2015, the entire disclosure of which is incorporated by reference herein.

BACKGROUND

Technical Field

Exemplary embodiments of the present disclosure relate to an image reading device to read image information of an original document, and further relate to an image forming apparatus including the image reading device, such as a copier, a printer, a facsimile machine, or a multifunction apparatus combining one or more functions of the above apparatuses.

Background Art

An image reading device incorporated in an image forming apparatus such as a copier or a printer typically includes an image reading unit or a scanner to read image information of an original document placed on an exposure glass or contact glass while the scanner moves in a predetermined direction. More specifically, such an image reading device includes optical parts such as a light source, lenses, mirrors, image sensors, and the like. In addition, the image reading device includes a housing or a frame on which a guide member such as a guide rod is mounted and engaged with the image reading unit because both ends of the guide member are secured to the housing. The image reading unit is guided by the guide member and moves in a predetermined direction, and reads image information of the original document placed on the exposure glass.

SUMMARY

In one embodiment of the disclosure, provided is an improved image reading device including a frame; an image reading unit to read, while moving in a predetermined direction, image information of a document placed on an exposure glass; a guide extending in the predetermined direction and supported by the frame, to engage and guide the image reading unit to move the image reading unit in the predetermined direction; a biasing member to bias the guide in a direction against a direction in which the guide bends due to weight of the guide and weight of the image reading unit; and an adjuster to adjust a biasing force of the biasing member against the guide. Also provided is an improved image forming apparatus including the optimal image reading device as described above.

These and other features and advantages of the present disclosure will become apparent upon consideration of the following description of embodiments of the present disclosure when taken in conjunction with the accompanying drawings.

BRIEF DESCRIPTION OF THE DRAWINGS

The aforementioned and other aspects, features, and advantages of the present disclosure would be better understood by reference to the following detailed description when considered in connection with the accompanying drawings, wherein.

DETAILED DESCRIPTION

Figure 1:
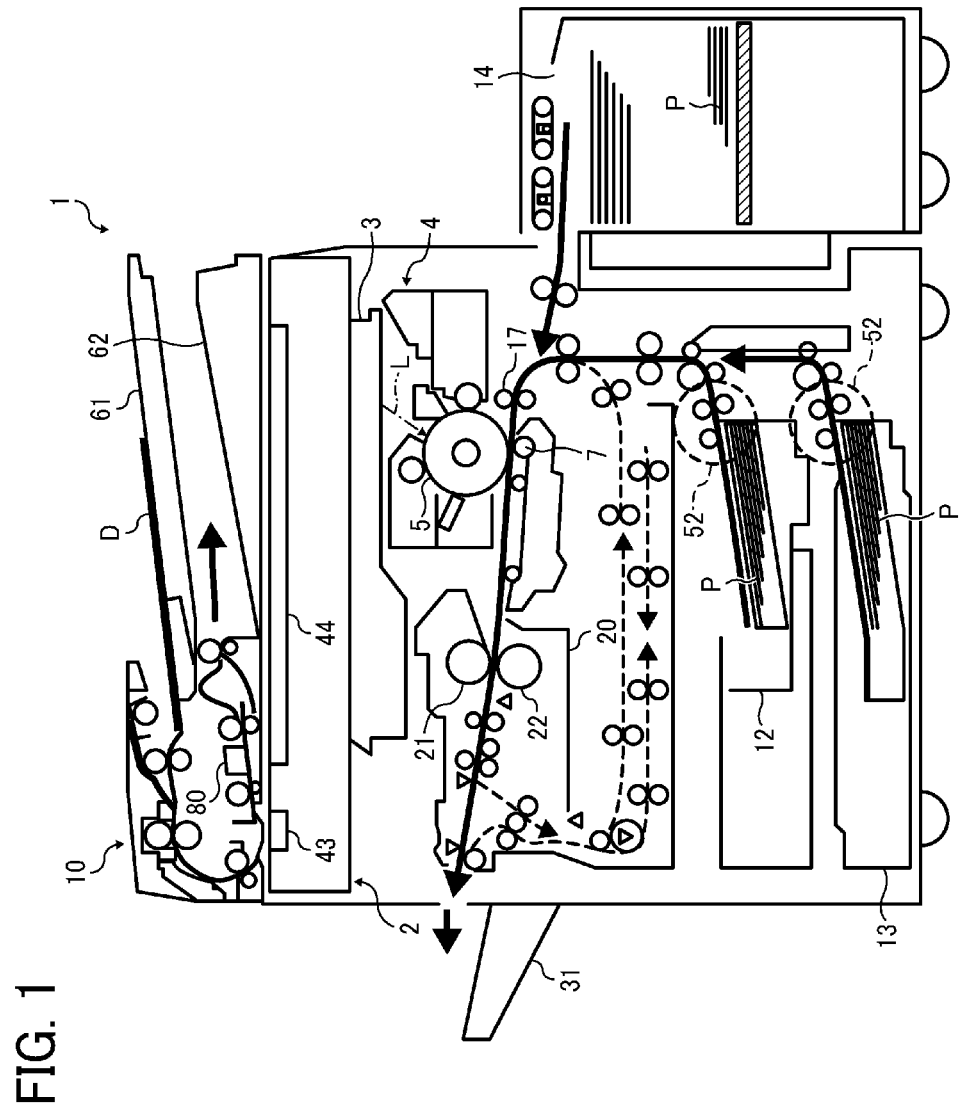
FIG. 1 schematically illustrates an image forming apparatus according to an embodiment of the present disclosure.

Hereinafter, embodiments of the present disclosure will be described with reference to accompanying drawings. In each figure, the same reference numeral is applied to the same or equivalent part, and redundant explanation is omitted as appropriate.

First, with reference to FIG. 1, overall structure and operation of an image forming apparatus 1 will be described.

The image forming apparatus 1 that functions as a copier includes an image reading device 2 to optically read image information of a document D; an exposure device 3 to irradiate exposure light L based on the image information read by the image reading device 2 or a second image reading device 80 onto a photoconductor drum 5; an image forming section 4 to form a toner image on the photoconductor drum 5; and a transfer section 7 to transfer the toner image formed on the photoconductor drum 5 to a sheet P. The image forming apparatus 1 further includes a document feeder 10 that conveys the document D set on a document platen 61 to a second exposure glass 43 of the image reading device 2 or to the second image reading device 80, and discharges the document D onto a document ejection portion 62. The image forming apparatus 1 further includes sheet feeding sections 12, 13, and 14, in which a plurality of sheets P is stored; a registration roller pair or a timing roller pair 17 that feeds the sheet P to the transfer section 7; a fixing device 20 to fix the toner image or an unfixed image borne on the sheet P; a fixing roller 21 disposed in the fixing device 20; and a pressure roller 22 disposed in the fixing device 20. The image forming apparatus further includes a sheet ejection tray 31 onto which the sheet P discharged from a body of the image forming apparatus 1 is stacked. The second image reading device 80 optically reads image information of a back of the document D conveyed by the document feeder 10. The document feeder 10 is disposed to cover an upper face of the image reading device 2 and is configured to swing about a hinge, so that the upper face of the image reading device 2, where a first exposure glass 44 and the second exposure glass 43 are disposed, can be alternately exposed or covered.

Referring to FIG. 1, an operation of the image forming apparatus 1 in the normal image formation will be described. The document D is placed on the document platen 61 or placed on the first exposure glass 44 depending on the selection of a user after opening the document feeder 10. In the document feeder 10, the document D placed on the document platen 61 is fed from the document platen 61 and passes the second exposure glass 43 of the image reading device 2. At this time, a contact image sensor (CIS) disposed at a bottom of the second exposure glass 43 optically reads image information of a front side of the document D that passes through an upper part of the second exposure glass 43. The image information optically read by the CIS at the second exposure glass 43 is converted into electrical signals, which are sent to the exposure device 3. The exposure device 3 emits exposure light L, such as laser beams, based on the image information of the electrical signals, onto the photoconductor drum 5 of the image forming section 4.

When the document D is placed on the first exposure glass 44 after opening the document feeder 10, an image reading unit 45 (see FIGS. 4 to 6) while running in a predetermined direction or a lateral direction in FIG. 1, optically reads the image information of the document D placed on the first exposure glass 44. The image information optically read by the image reading unit 45 at the first exposure glass 44 is converted to electrical signals, which are sent to the exposure device 3. The exposure device 3 emits the exposure light L such as laser beams based on the mage information of the electrical signals, onto the photoconductor drum 5 of the image forming section 4.

On the other hand, the photoconductor drum 5 disposed in the image forming section 4 rotates in a clockwise direction and is subjected to predetermined image formation processes from a charging process, exposure process, and developing process, through which a toner image corresponding to the image information is formed on the photoconductor drum 5. The image formed on the photoconductor drum 5 is transferred onto the sheet P that has been conveyed by the registration roller pair 17.

Specifically, the sheet P is conveyed to the transfer section 7 as follows. First, one of the sheet feeding sections 12, 13, and 14 in the image forming apparatus 1 is selected automatically or manually. Here, a case in which the topmost sheet feeding section 12 in the image forming apparatus is selected will be described. Each of sheet feed devices 52 includes various rollers including feed rollers, pickup rollers, and backup rollers, and forms a conveyance path. A topmost sheet P among the sheets P stored in the sheet feeding section 12 is fed by the sheet feed device 52 through the conveyance path. The sheet P passes through the conveyance path along which a plurality of feed rollers is disposed, and reaches a position of the registration roller pair 17.

Upon reaching the registration roller pair 17, the sheet P is conveyed to the transfer section 7 at a timing aligned with a position of the image formed on the photoconductor drum 5 (i.e., the transfer process). After passing through the position of the transfer section 7 in the above transfer process, the sheet P reaches the fixing device 20 via the conveyance path. The sheet P that has reached the fixing device 20 is inserted between the fixing roller 21 and the pressure roller 22, where the sheet P receives heat from the fixing roller 21 and pressure from both the fixing roller 21 and the pressure roller 22, so that the toner image is fixed onto the sheet P (i.e., the fixing process). The sheet P after the fixing process is fed out from a fixing nip formed by contact between the fixing roller 21 and the pressure roller 22, is discharged from the body of the image forming apparatus 1, and is stacked on the sheet ejection tray 31 as an output image to complete a single image formation process.

A case in which duplex copying is performed will be described. Namely, the document D is placed on the document platen 61 of the document feeder 10 and the image is also formed on a back of the sheet P, in addition to a front of the sheet P, based on the image information on the back of the document D. Specifically, when the sheet P passes the position of the second image reading device 80 (or the CIS) via the position of the second exposure glass 43, the second image reading device 80 optically reads the image information on the back of the document D that passes below the second image reading device 80. Then, similarly to the image formation process based on the front side image of the document D, the image formation process based on the optical image information on the back of the document D read by the second image reading device 80 and transmitted to the exposure device 3, is performed.

Figure 2:
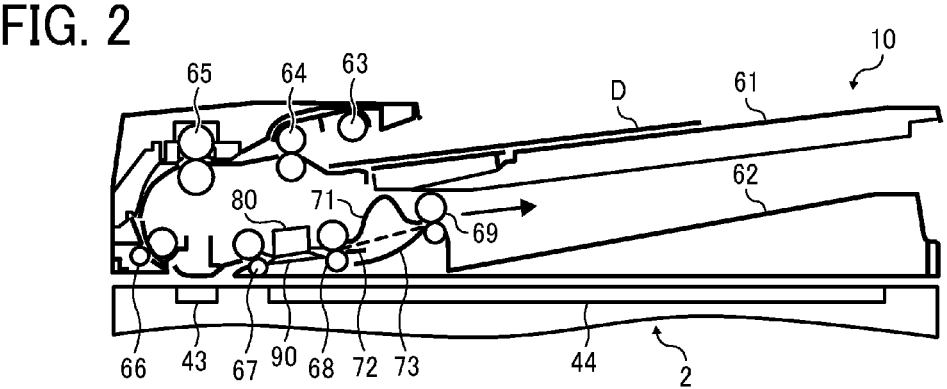
FIG. 2 illustrates a structure of a document feeder.

Next, referring to FIG. 2, the document feeder 10 will be described in brief. The document feeder 10 includes the document platen 61; the second image reading device 80; a contact member 90; the document ejection portion 62 serving as a sheet ejection tray; a pickup roller 63; a separation roller pair 64; a plurality of feed roller pairs 65, 66, 67, and 68; an ejection roller pair 69; an upper guide plate 71; a first lower guide plate 72; a second lower guide plate 73, and the like.

Herein, an open space is formed above the document platen 61, so that the user can place the document D from above with a front side of the document D faced up and a bundle of plural sheets of document D can be placed on top of the document platen 61. The document ejection portion 62 is disposed below the document platen 61. The image on the document D is read by the image reading device 2 or the second image reading device 80, and a sheet of document D (or plural sheets of document D) after the above reading process is ejected onto the document ejection portion 62.

Further, in the conveyance path from the document platen 61 to the document ejection portion 62, sequentially disposed from upstream in a sheet conveyance direction are: the pickup roller 63, the separation roller pair 64, a first feed roller pair 65 (or a contact roller pair), a second feed roller pair 66 (or an inlet roller pair), a third feed roller pair 67 (or a first outlet roller pair), a fourth feed roller pair 68 (or a second outlet roller pair) serving as a downstream roller pair, and an ejection roller pair 69. The rollers 63, 64, 65, 66, 67, 68, and 69 feed the document D placed on the document platen 61 toward the second exposure glass 43 disposed inside the image reading device 2 or toward the second image reading device 80. The rollers also feed the document D after the image reading process toward the document ejection portion 62.

Figure 3:
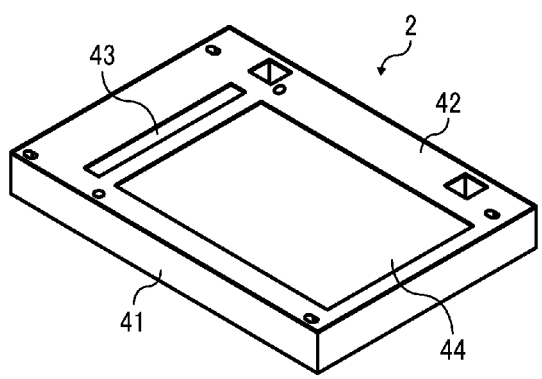
FIG. 3 is a perspective view illustrating an image reading device.
Figure 4:
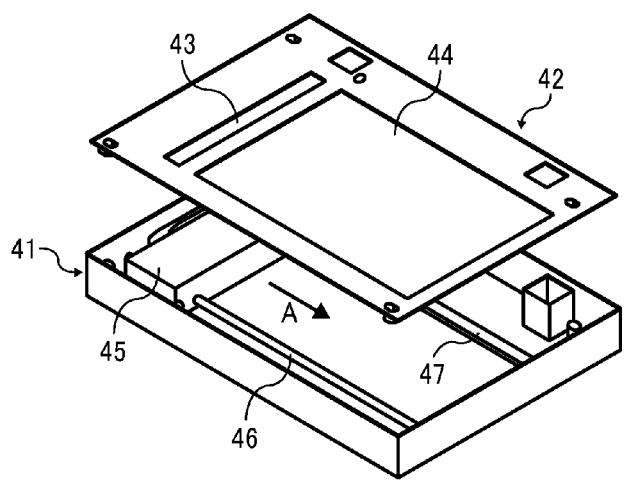
FIG. 4 is a perspective view illustrating the image reading device from which a cover member is removed.

Next, referring to FIGS. 3 to 6, a structure and operation of the image reading device 2 will be described. The image reading device 2 is disposed below the document feeder 10. As illustrated in FIGS. 3 and 4, the image reading device 2 includes a frame 41 and a cover member 42 is secured to the frame 41 with screws to thereby form a substantially closed internal space. The image reading unit 45, a guide rod 46, a rail 47, and a moving device are disposed inside the closed space. The cover member 42 includes two substantially-rectangular openings, and the first exposure glass 44 and the second exposure glass 43 are disposed opposite each opening, respectively. Both the frame 41 and the cover member 42 are formed of resin materials having high mechanical strength. The second contract glass 43 is formed of light transmissive material such as transparent glass having a surface that serves as an image reading surface and a document conveyance surface. Specifically, as illustrated in FIGS. 1 and 2, the document D is conveyed by the document feeder 10 along the image reading surface or document conveyance surface, a light emission device of the CIS emits light to the document D via the second exposure glass 43, and the light reflected by the document D is received by a light receiving device of the CIS via the second exposure glass 43, so that the image information of the document D is read by the CIS.

Further, the first exposure glass 44 is formed of light transmissive material such as transparent glass and has a surface to serve as a platen of the document D. Thus, the image information of the document D placed on the first exposure glass 44 by the user is optically read by the image reading unit 45 that runs in the predetermined sub-scanning direction indicated by arrow A in FIG. 4.

Figure 5:
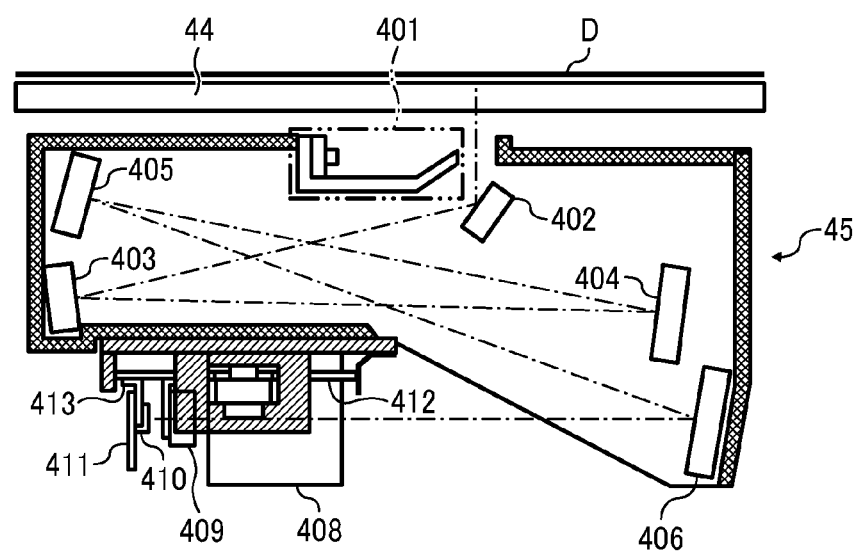
FIG. 5 illustrates a structure of an image reading unit.

Referring to FIG. 5, a structure and operation of the image reading unit 45 will be described in more detail. The image reading unit 45 includes a light source 401, a group of mirrors 402, 403, 404, 405, and 406, lenses 408 and 409, a substrate 411, and an image sensor 410 mounted on the substrate 411. While the image reading unit 45 is moving in the predetermined sub-scanning direction, the light source 401 emits light to the document D placed on the first exposure glass 44 via the first exposure glass 44 in a main scanning direction perpendicular to the sub-scanning direction. The light reflected by the document D is received by the image sensor 410 such as a charge coupled device (CCD) or a complementary metal oxide semiconductor (CMOS) mounted on the substrate 411, via the first exposure glass 44, the mirrors 402 to 406, and the lenses 408 and 409, so that the image information of the document D is read by the image sensor 410. The substrate 411 on which the image sensor 410 is mounted is secured to a bracket 413 disposed on an adjusting plate 412. The adjusting plate 412 adjusts a position of the substrate 411.

Figure 6:
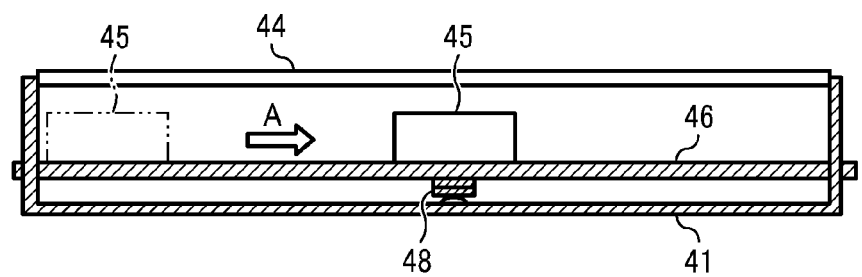
FIG. 6 schematically illustrates an inside of the image reading device along a direction of movement of the image reading unit.
Figure 7:
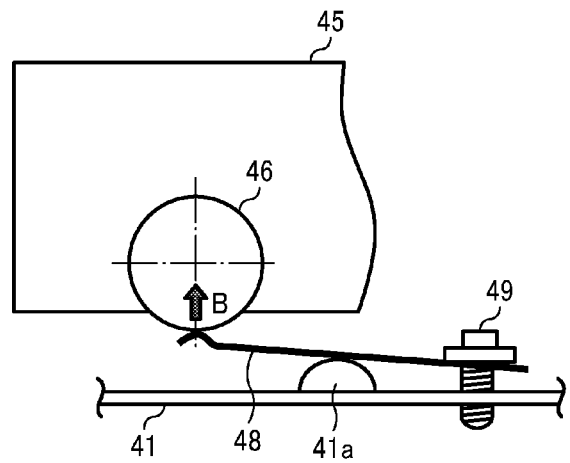
FIG. 7 is an enlarged view of a biasing member and an adjusting member.

As illustrated in FIGS. 4, 6, and 7, the guide rod 46, a shaft member, that serves as a guide member is formed of metal material, engages the image reading unit 45, and extends to guide the image reading unit 45 that runs in the predetermined sub-scanning direction, that is, the direction indicated by arrow A in FIG. 6. In the present embodiment, both ends of the guide rod 46 in the sub-scanning direction are supported by the frame 41. As illustrated in FIG. 4, the rail 47 is formed of a thick plate having relatively high mechanical strength and extends in the sub-scanning direction so as to slidably support the image reading unit 45. The image reading unit 45 is connected to a known moving device including a wire device, feed screw device, and motor device, and moves back and forth in the sub-scanning direction via the moving device controlled by a controller.

Referring now to FIGS. 6 and 7, a structure and operation of the image reading device 2 will be described in more detail. The image reading device 2 includes the image reading unit 45 that reads, while moving in the predetermined direction, image information of the document D place on the first exposure glass 44, and the guide rod 46 that engages the image reading unit 45 and extends in the predetermined direction to guide the image reading unit 45 that runs in the predetermined direction. Both ends of the guide rod 46 in the predetermined direction are supported to the frame 41 of the image reading device 2.

Here, further referring to FIGS. 6 and 7, the image reading device 2 according to the present embodiment includes a leaf spring 48 that serves as a biasing member, and an adjusting screw 49 that serves as an adjusting member. The leaf spring 48 biases the guide rod 46 in a direction opposite a direction in which the guide rod 46 bends due to the weight of the guide rod 46 and the weight of the image reading unit 45, as indicated by arrow B in FIG. 7. The adjusting screw 49 serves to adjust the biasing force of the leaf spring 48 applied to the guide rod 46.

More specifically, the longitudinal center portion of the leaf spring 48 functions as a supporting point to contact a convex portion 41a disposed on the frame 41, one edge of the leaf spring 48 in the longitudinal direction (on the left of FIG. 7) functions as an action point to contact the guide rod 46, and the other edge of the leaf spring 48 in the longitudinal direction (on the right of FIG. 7) functions as an effort point to contact a head of the adjusting screw 49. The adjusting screw 49 is configured such that the position of the effort point supported by the frame at the other edge of the leaf spring 48 in the longitudinal direction is variable. The adjusting screw 49 screws together a female screw portion disposed on the frame 41, and the depth or height of the screw portion is adjustable so that the height of the head (or the effort point) that the leaf spring 48 contacts, can be variable.

Specifically, as illustrated in FIG. 7, when increasing the biasing force of the leaf spring 48 against the guide rod 46 in the direction as indicated by arrow B in FIG. 7, the adjusting screw 49 is turned to increase the depth of screwing of the adjusting screw 49, so that the position of the head of the adjusting screw 49 approaches the frame 41. In contrast, when decreasing the biasing force of the leaf spring 48 against the guide rod 46 in the direction B, the adjusting screw 49 is turned to a direction to decrease the depth of screwing of the adjusting screw 49, so that the position of the head recedes from the frame 41. The biasing force of the leaf spring 48 can thus be adjusted to be an appropriate value, and occurrence of bending of the guide rod 46 can be reduced.

Figure 8A:
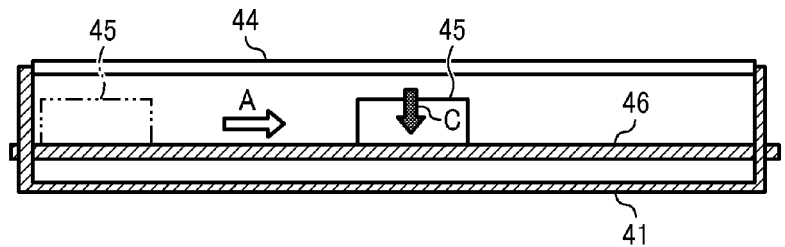
FIGS. 8A and 8B each schematically illustrate an inside of comparative examples of the image reading device.
Figure 9:
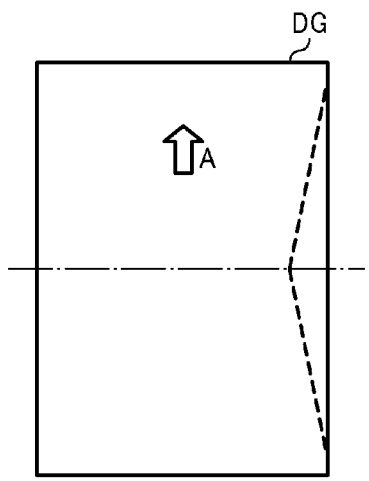
FIG. 9 schematically illustrates a read image read by the image reading device.

FIG. 8A is a comparative example in which the biasing member to correct bending of the guide rod 46 is not provided. As indicated by arrow C in FIG. 8A, the guide rod 46 bends due to the weight of the guide rod 46 itself and the weight of the image reading unit 45. When the image reading unit 45 reads the image information of the document in such a state that the guide rod 46 is bent, scaling errors in the main scanning direction toward the sub-scanning direction (that is, in the arrow direction indicated by arrow A) as illustrated in FIG. 9 by a broken line, or a squareness failure occurs in a read image DG. Specifically, when the image reading unit 45 positions at an edge in the sub-scanning direction, bending of the guide rod 46 is relatively small. As a result, scaling errors of the read image DG in the main scanning direction are small. When the image reading unit 45 positions at a center in the sub-scanning direction, however, bending of the guide rod 46 is relatively large. As a result, scaling errors of the read image DG in the main scanning direction become greater, resulting in squareness failure or a failure to capture the four-square corners of the read image DG.

Figure 8B:
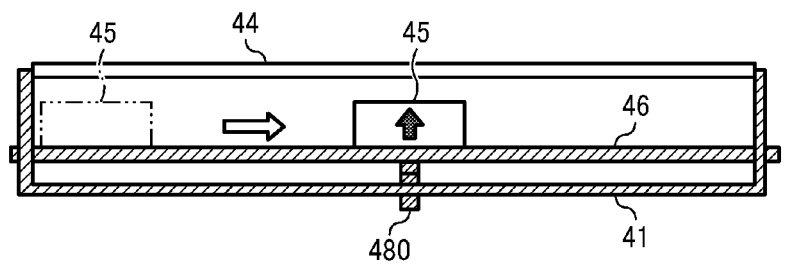

FIG. 8B is another comparative example in which a rigid body 480 is so disposed as to contact a center portion of the guide rod 46 in the sub-scanning direction. In this case, a bending status of the guide rod 46 greatly changes at a moment the image reading unit 45 moves to the position where the rigid body 480 is disposed, and before and after the image reading unit 45 passes through the rigid body 480. Otherwise, reaction force generated between the guide rod 46 and the rigid body 480 increases. As a result, bending of the guide rod 46 cannot be effectively counteracted, and the above-described abnormality of the read image DG cannot be sufficiently prevented.

By contrast, in the present embodiment, the biasing member or the leaf spring 48 to correct bending of the guide rod 46 is disposed, and the biasing force of the leaf spring is adjustable by the adjusting screw 49. As a result, bending of the guide rod 46 that occurs while the image reading unit 45 is moving can be optimized. Thus, the bending of the guide rod 46 is effectively removed and the above-described occurrence of abnormal image in the read image DG can be effectively prevented. In addition, adjustment of the biasing force using the adjusting screw 49 is preferably performed while checking a degree of the scaling errors in the main scanning direction and the squareness failure appeared in the read image DG so as not to cause the above abnormality.

Herein, as illustrated in FIG. 7, according to the present embodiment, the leaf spring 48 is so disposed as to contact a bottom of the guide rod 46 and press the guide rod 46 along a virtual vertical line passing through a central axis of the guide rod 46 and in a direction against the gravitational direction (as indicated by the arrow B in FIG. 7). Specifically, a leading edge of the leaf spring 48 has a proper, substantially curved shape, and the biasing force of the leaf spring 48 exerts in a straight, vertical direction, not in an oblique direction. With this structure, the biasing force of the leaf spring 48 is exerted to the guide rod 46 effectively, and the bending of the guide rod 46 can be adjusted effectively.

In addition, as illustrated in FIG. 6, in the present embodiment, the leaf spring 48 is disposed to contact the guide rod 46 at a central portion in the sub-scanning direction relative to both ends of the guide rod 46 supported by the frame 41. This is because the bending of the guide rod 46 increases maximally at the center in the sub-scanning direction. Because the leaf spring 48 is constructed as described above, the biasing force of the leaf spring 48 exerts effectively to the guide rod 46, and the bending of the guide rod 46 can be effectively adjusted.

Figure 10:
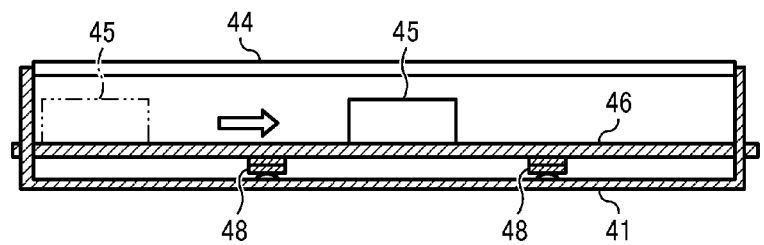
FIG. 10 illustrates an inside of the image reading device according to a first modified example.

FIG. 10 is a first modified example of the image reading device 2, in which a plurality of leaf springs 48 as biasing members and the adjusting screws 49 as adjusting members are disposed away from each other in the sub-scanning direction at multiple positions. Specifically, the adjusting device as illustrated in FIG. 7 are disposed at plural separate positions in the sub-scanning direction as illustrated in FIG. 10 at balanced, substantially equal intervals, so that the bending of the guide rod 46 can be effectively removed. With this structure, the above-described optimal effect can be exerted.

Figure 11:
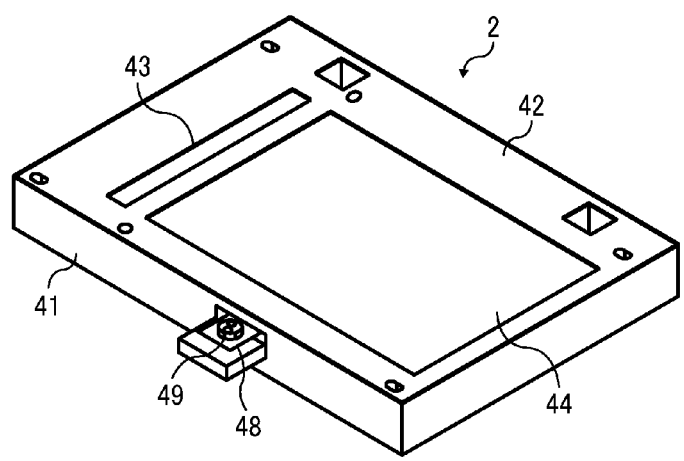
FIG. 11 is a perspective view of the image reading device according to a second modified example.

Further, FIG. 11 is a second modified example of the image reading device 2, in which the adjusting screw 49 is disposed at a position exposed outside the image reading device 2. Specifically, the adjusting screw 49, the leaf spring 48 with which the adjusting screw engages, and part of the frame 41 corresponding to the adjusting screw 49 and the leaf spring 48 are exposed outside the image reading device 2 via a hole. With this structure, adjustment of the biasing force using the adjusting screw 49 can be easily made without disassembling the image reading device 2. In particular, as described above, the work without disassembling of the image reading device 2 is preferable to adjust the biasing force of the adjusting screw 49 so as not to cause any abnormality, while checking a degree of scaling errors in the main scanning direction and squareness failure in the read image DG.

The image reading device 2 according to the present embodiment includes the leaf spring 48 to bias the guide rod 46 in a direction against the direction in which the guide rod 46 bends due to the weight of the guide rod 46 that engages the image reading unit 45 and guides the image reading unit 45 that moves in the predetermined direction, and the weight of the image reading unit 45. Further, provided is the adjusting screw 49 that adjusts the biasing force of the leaf spring 48 against the guide rod 46. With this structure, when the image reading unit 45 reads, while being guided by the guide rod 46 and moving in the predetermined direction, the image information on the document D, various abnormality and failure appearing in the read image DG such as scaling errors in the main scanning direction and squareness failure can be reduced.

It is to be noted that although the various embodiments of the present disclosure are applied to an image reading device disposed in a monochrome image forming apparatus, nevertheless the present disclosure can properly be applied to an image reading device disposed in a color image forming apparatus. The present embodiments can also be applied to an image reading device disposed in an image forming apparatus having no document feeder. Further, although the present embodiments are applied to an image reading device disposed in the image forming apparatus employing the electrophotographic method, nevertheless the present embodiments can be applied to other types of image forming apparatuses employing other methods, including inkjet and mimeographic methods. Even with the other types of image forming apparatuses, the same effect as that of the present disclosure can be obtained.

In the present embodiment, bending of the guide rod 46 as a guide member is adjusted by the biasing member and the adjusting member; however, when the rail 47 bends to affect the quality of the read image due to low mechanical strength of the rail 47, bending of the rail 47 as a guide member can be adjusted by use of any biasing member and adjusting member. In particular, when the similar member as the guide rod 46 is used instead of the rail 47, the similar structure as embodied in the present disclosure can be applied to the similar member and the same effect as that of the present disclosure can be obtained.

In the above description, the "document" means the document in the form of paper, and includes any other and all sheet type documents such as an overhead projector (OHP) sheet.

Additional modifications and variations of the present disclosure are possible in light of the above teachings. It is therefore to be understood that, within the scope of the appended claims, the disclosure may be practiced other than as specifically described herein.

What is claimed is:

1. An image reading device comprising:
   a frame;
   an image reading unit to read, while moving in a predetermined direction, image information of a document placed on an exposure glass;
   a guide extending in the predetermined direction and supported by the frame, to engage and guide the image reading unit to move the image reading unit in the predetermined direction;
   a biasing member to bias the guide in a direction against a direction in which the guide bends due to weight of the guide and weight of the image reading unit; and
   an adjuster to adjust a biasing force of the biasing member against the guide.

2. The image reading device according to claim 1, wherein the guide is a guide rod having both ends in the predetermined direction supported by the frame,
   wherein the biasing member is a leaf spring including:
      a longitudinal center portion that contacts, as a supporting point, a convex portion of the frame;

a first longitudinal end that contacts, as an action point, the guide rod; and a second longitudinal end opposite the first longitudinal end, and wherein the adjuster is an adjusting screw to adjust and vary a position of an effort point supported by the frame at the second longitudinal end of the leaf spring.

3. The image reading device according to claim 2, wherein the leaf spring is disposed to contact a bottom of the guide rod to bias the guide rod along a vertical line passing through a central axis of the guide rod and against gravity.

4. The image reading device according to claim 2, wherein the leaf spring is disposed to contact a central portion of the guide rod in the predetermined direction.

5. The image reading device according to claim 1, wherein a plurality of biasing members and a plurality of adjusters are disposed at multiple separate positions in the predetermined direction.

6. The image reading device according to claim 1, wherein the adjuster is exposed outside the image reading device.

7. An image forming apparatus comprising an image reading device, the image reading device including:

an image reading unit to read, while moving in a predetermined direction, image information of a document placed on an exposure glass;

a guide extending in the predetermined direction to engage and guide the image reading unit to move the image reading unit in the predetermined direction;

a biasing member to bias the guide in a direction against a direction in which the guide bends due to weight of the guide and weight of the image reading unit; and an adjuster to adjust a biasing force of the biasing member against the guide.

* * * * *